United States Patent
Hsu et al.

(10) Patent No.: US 7,753,768 B2
(45) Date of Patent: Jul. 13, 2010

(54) SUIT VARIABLE MAHJONG TILE AND A MAHJONG GAMING APPARATUS WITH SUIT VARIABLE MAHJONG TILES

(75) Inventors: Tien-Shu Hsu, 5F-8, No. 210, Gungye 38 Rd., Hsitun Dist., Taichung (TW); Shun-Tsung Hsu, Taichung (TW); Ying-Nan Lai, Taichung (TW)

(73) Assignee: Tien-Shu Hsu, Taichung (TW)

( * ) Notice: Subject to any disclaimer, the term of this patent is extended or adjusted under 35 U.S.C. 154(b) by 253 days.

(21) Appl. No.: 12/115,393

(22) Filed: May 5, 2008

(65) Prior Publication Data
US 2009/0275373 A1 Nov. 5, 2009

(51) Int. Cl.
*G06F 17/00* (2006.01)
(52) U.S. Cl. ........................................ 463/11; 273/293
(58) Field of Classification Search .................. 463/11; 273/293
See application file for complete search history.

(56) References Cited

U.S. PATENT DOCUMENTS 5,934,674 A * 8/1999 Bukowsky .................. 273/278
6,398,642 B1 * 6/2002 Kim .............................. 463/11
7,285,050 B2 * 10/2007 Kuwana ...................... 463/42
7,476,154 B2 * 1/2009 Kogo et al. .................... 463/30

* cited by examiner

*Primary Examiner*—Dmitry Suhol
*Assistant Examiner*—Malina K Rustemeyer
(74) *Attorney, Agent, or Firm*—patenttm.us

(57) ABSTRACT

A mahjong gaming apparatus with suit variable mahjong tiles has a server apparatus and multiple player terminal apparatuses. The server apparatus has a server and a random number generator. The random number generator is controlled by the server to randomly generate a suit of a particular mahjong tile. Each player terminal apparatus has at least one suit variable mahjong tile and a player terminal. The suit variable mahjong tile is capable of generating lines corresponding to the suit. The player terminal corresponds to a player, accepts inputs from the player, receives the suit from the server apparatus and controls the suit variable mahjong tile to generate the lines corresponding to the suit. Players may hold the suit variable mahjong tile to feel the lines before uncovering the mahjong tile.

7 Claims, 8 Drawing Sheets

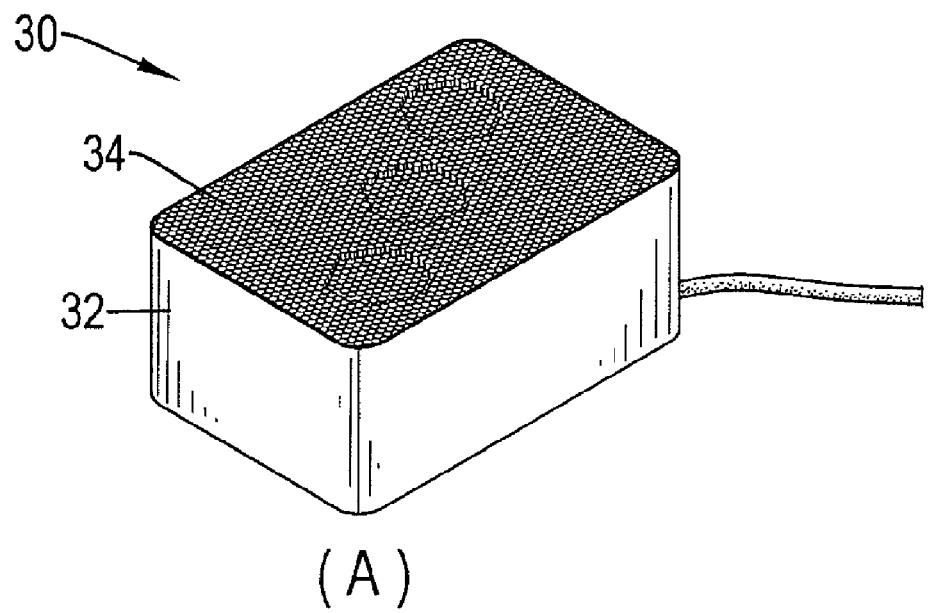
(A)
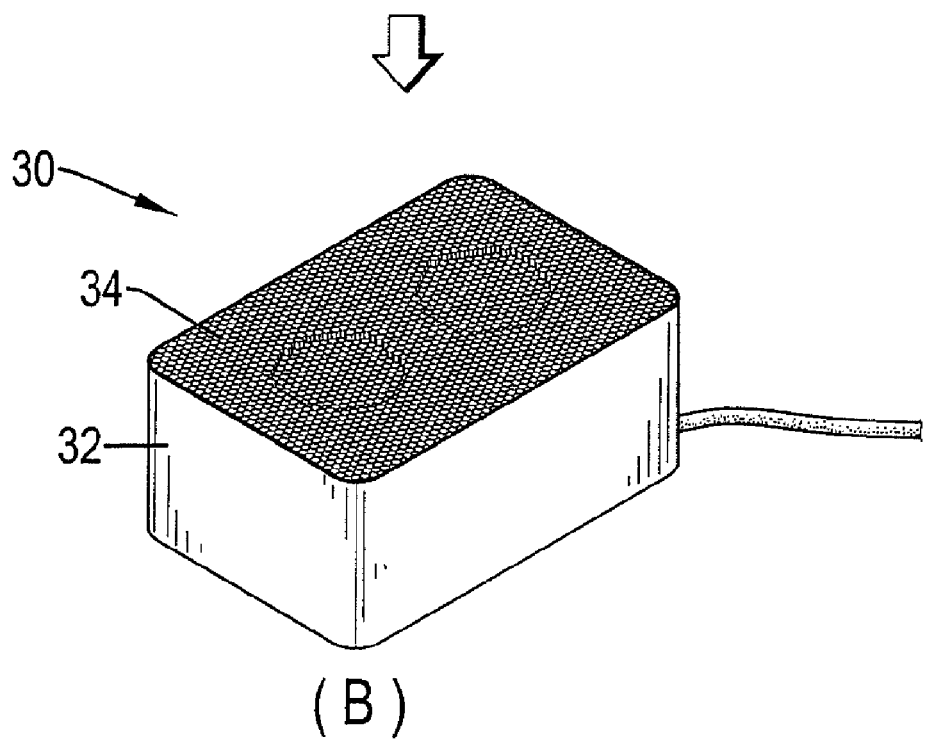
(B)
FIG.3

SUIT VARIABLE MAHJONG TILE AND A MAHJONG GAMING APPARATUS WITH SUIT VARIABLE MAHJONG TILES

BACKGROUND OF THE INVENTION

1. Field of Invention

The present invention relates to a mahjong tile, and more particularly to a suit variable mahjong tile.

2. Description of the Related Art

Mahjong (also called mah-jongg by the American association) is a game originated in China. Mahjong is a great game for everyone since involves skill, strategy and calculation. In Asia, Mahjong is also popularly played as a gambling game in Casino. There are many variations of the Mahjong, such like Chinese classical Mahjong, Hong Kong Mahjong, Taiwanese Mahjong, Ton-Ze Mahjong and the like. Players hold different numbers of tiles and follow different rules in different Mahjong games. Take the Ton-Ze Mahjong as an example, there are forty tiles are used which consist of thirty-six "tubes (also named Dots)" and four "bai-bun (also named White)" in a set of mahjong tiles (commonly comprises 136 tiles) and four roles which are BANKER, CHU, CHUAN and WEI in the game. Players can bet any or many roles of them or be the Banker. Each role gets two tiles randomly after counting down a bet time to zero. Players win who had placed wagers on the role that has tiles having a largest sum of tiles' points or having a largest pair.

To increase convenience and accept more players to play at the same time, kinds of electrical Mahjong apparatuses were performed and were popular for awhile. Normally, the electrical Mahjong apparatuses have multiple player terminals, each having a monitor and an interface. Each player sits in front of one player terminal to input wagers and to read suits of dealt Mahjong tiles from the monitor when plays the game.

Even though the electronic Mahjong apparatus may be convenient to play, players cannot hold the real mahjong tile and feel lines of suit of the mahjong tile with fingers before uncover to see the suit of the tile but just can only see the drawings of the suit shown on the monitor, thereby detracting from the fun and reality of holding real mahjong tile.

The present invention provides a suit variable mahjong tile and a mahjong gaming apparatus with the suit variable mahjong tiles to mitigate the shortcomings of the conventional electrical Mahjong apparatuses.

SUMMARY OF THE INVENTION

The primary objective of the present invention is to provide a suit variable mahjong tile and a mahjong gaming apparatus with the suit variable mahjong tiles that are line-changeable for raising enjoyment.

The mahjong gaming apparatus with suit variable mahjong tiles has a server apparatus and multiple player terminal apparatuses. The server apparatus has a server and a random number generator. The random number generator is controlled by the server to randomly generate a suit of a particular mahjong tile. Each player terminal apparatus has at least one suit variable mahjong tile and a player terminal. The suit variable mahjong tile is capable of generating lines corresponding to the suit. The player terminal corresponds to a player, accepts inputs from the player, receives the suit from the server apparatus and controls the suit variable mahjong tile to generate the lines corresponding to the suit. The player may hold the suit variable mahjong tile to feel the lines before uncovering the mahjong tile.

Other objectives, advantages and novel features of the invention will become more apparent from the following detailed description when taken in conjunction with the accompanying drawings.

BRIEF DESCRIPTION OF THE DRAWINGS

FIG. 3 is an operational perspective view of a suit variable mahjong tile in accordance with the present invention;

DETAILED DESCRIPTION OF THE INVENTION

Figure 1:
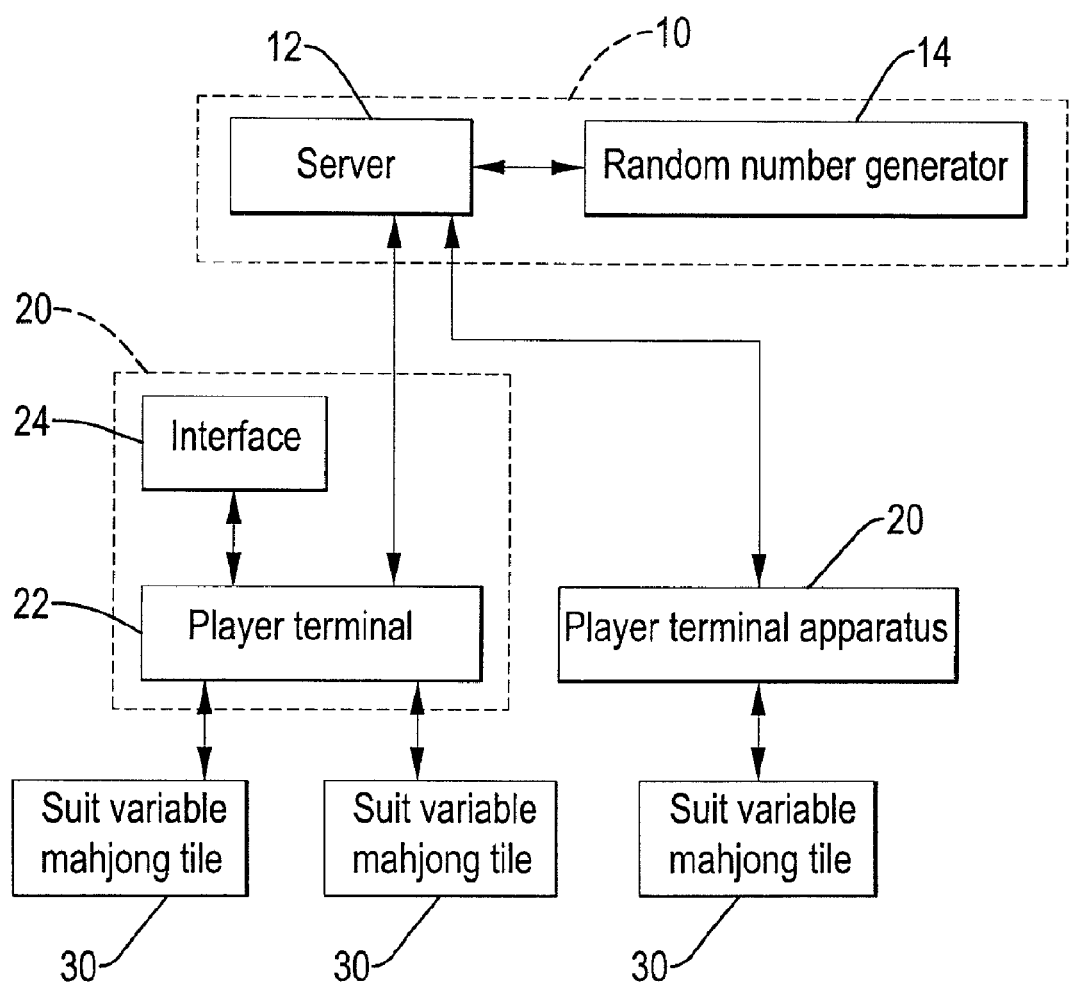
FIG. 1 is a block diagram of a mahjong gaming apparatus with suit variable mahjong tiles in accordance with the present invention.
Figure 2:
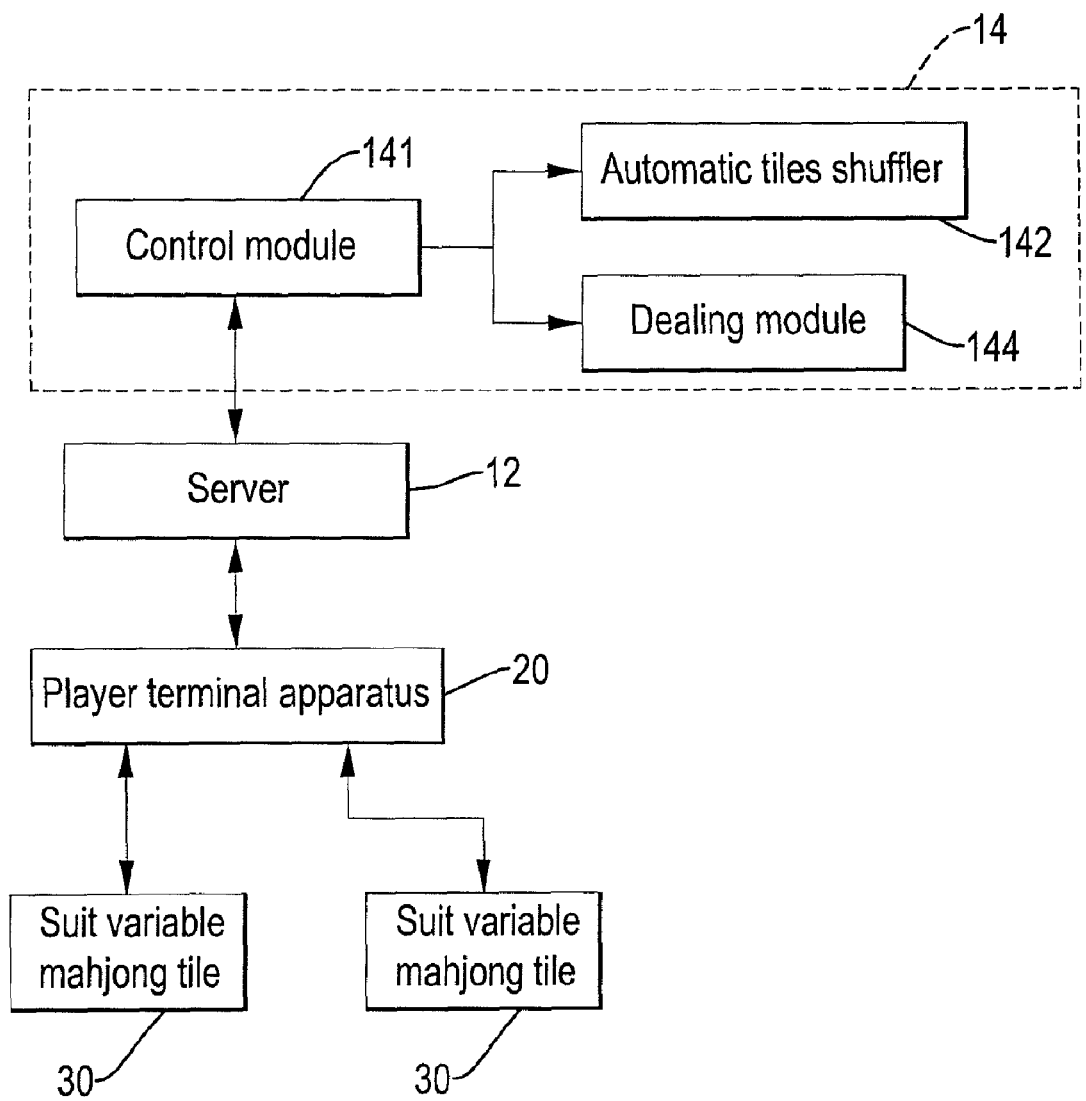
FIG. 2 is a block diagram of a preferred embodiment of mahjong gaming apparatus with suit variable mahjong tiles in FIG. 1.

With reference to FIGS. 1 and 2, a mahjong gaming apparatus with suit variable mahjong tiles in accordance with the present invention comprises a server apparatus (10) and multiple player terminal apparatuses (20).

The server apparatus (10) has a server (12) and a random number generator (14).

The server (12) runs a mahjong gaming program. The mahjong gaming program may be a Ton-Ze Mahjong, Chinese classical Mahjong, Hong Kong Mahjong, Taiwanese Mahjong or the like mahjong game.

The random number generator (14) is electronically connected to the server (12), is controlled by the server (12) to randomly generate a suit of a mahjong tile and may be a ball drawing machine, an automatic tile drawer or the like. In a preferred embodiment of the present invention, the random number generator (14) is an automatic tile drawer comprising an automatic tile shuffler (142), a dealing module (144) and a control module (141). As defined herein, the suit comprises Dots, Bamboos, Characters, Honors, Red, White, Get rich or the like.

Figure 6:
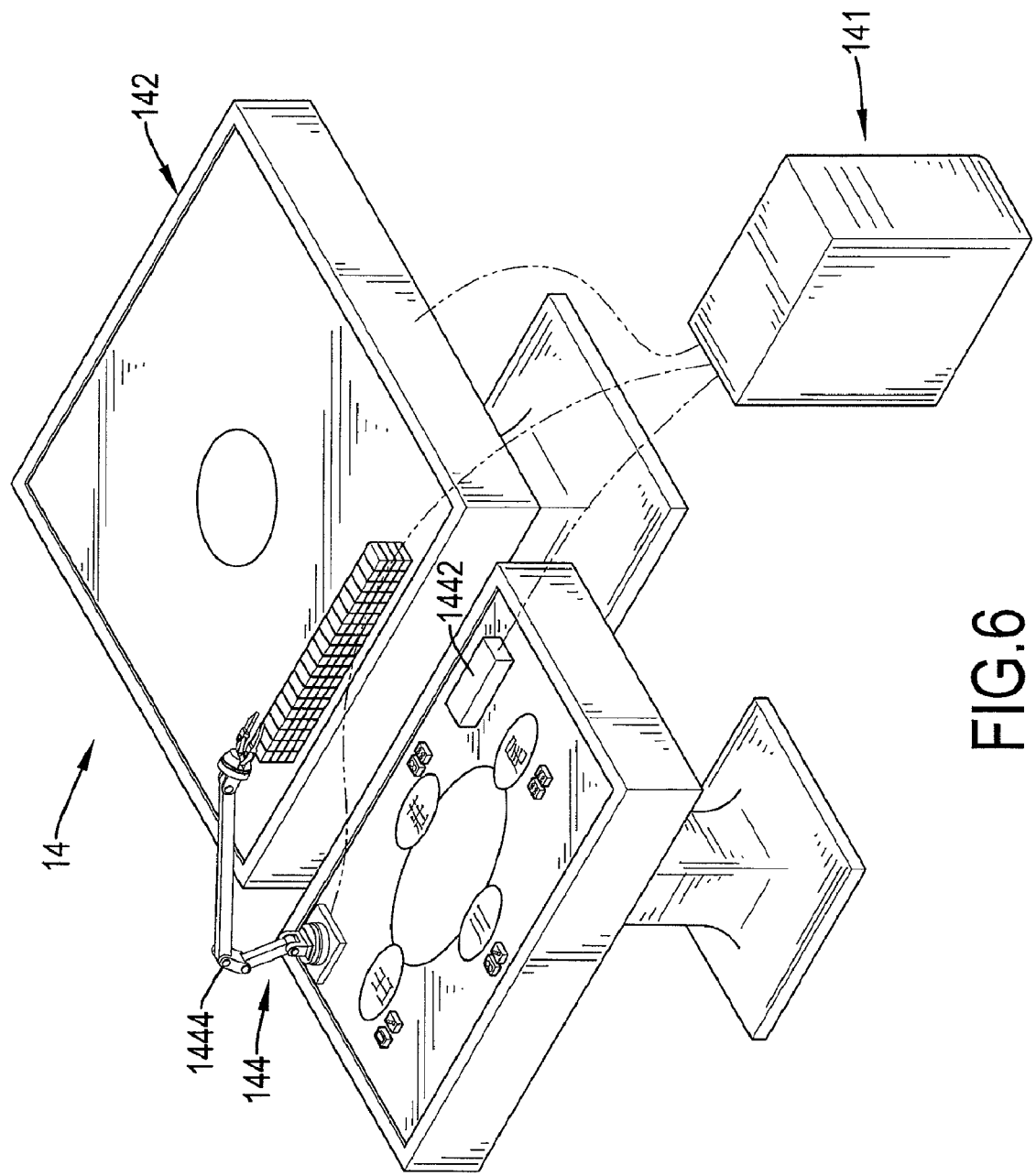
FIG. 6 is an operational perspective view of a random number generator in accordance with the preferred embodiment in FIG. 2.

The automatic tile shuffler (142) is capable of shuffling a whole or part set of conventional real mahjong tiles and rearranging the shuffled mahjong tiles under covered status and may be a conventional automatic mahjong shuffling table as shown in FIG. 6.

The dealing module (144) is capable of taking one of the shuffled mahjong tiles from the automatic tile shuffler (142) and recognizing the suit of the taken mahjong tile. With reference to FIG. 6, in the preferred embodiment of the present invention, the dealing module (144) has a robot (1444) and a recognizer (1442). The robot (1444) is controlled to take one of the shuffled mahjong tiles and move the taken mahjong tile to the recognizer (1442) for scanning and recognizing the suit of the taken mahjong tile.

The control module (141) is electronically connected independently to the server (12), the automatic tile shuffler (142) and the dealing module (144) and is controlled by the server (12) to randomly generate one suit of one of the real mahjong tiles. In the preferred embodiment of the present invention, the control module (141) controls the robot (1444) to take one of the real mahjong tile one by one and then move the taken mahjong tile to the recognizer (1442) to scan the suit of the taken mahjong tile, thereby the control module (141) reads the suit from the recognizer (1442).

Figure 7:
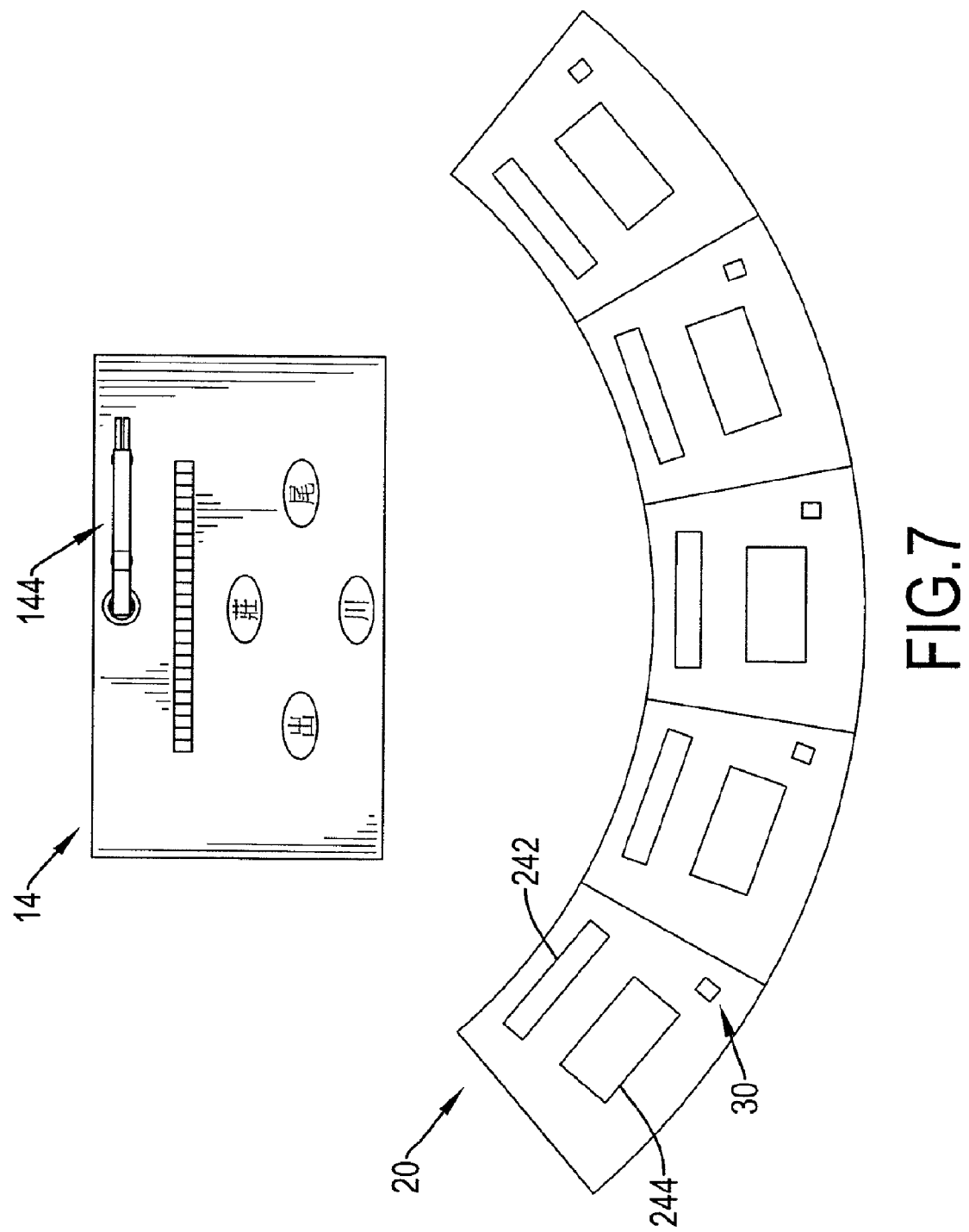
FIG. 7 is a top view of arc arranged multiple player terminal apparatuses in accordance with the present invention.

The player terminal apparatuses (20) are electronically connected to the server (12) and may be arranged as an arc as shown in FIG. 7. Each player corresponds to and seats in front of a player terminal apparatuses (20) and may face to the random number generator (14) when joins the game. Therefore, the server apparatus (10) may win the players' confidence because the players can see the whole drawing sequence (seeing the robot (1444) takes the real mahjong tiles one by one and scan the suit of the taken real mahjong tile to generate the suit image).

Each player terminal apparatus (20) has an interface (24), at least one suit variable mahjong tile (30) and a player terminal (22).

Figure 5:
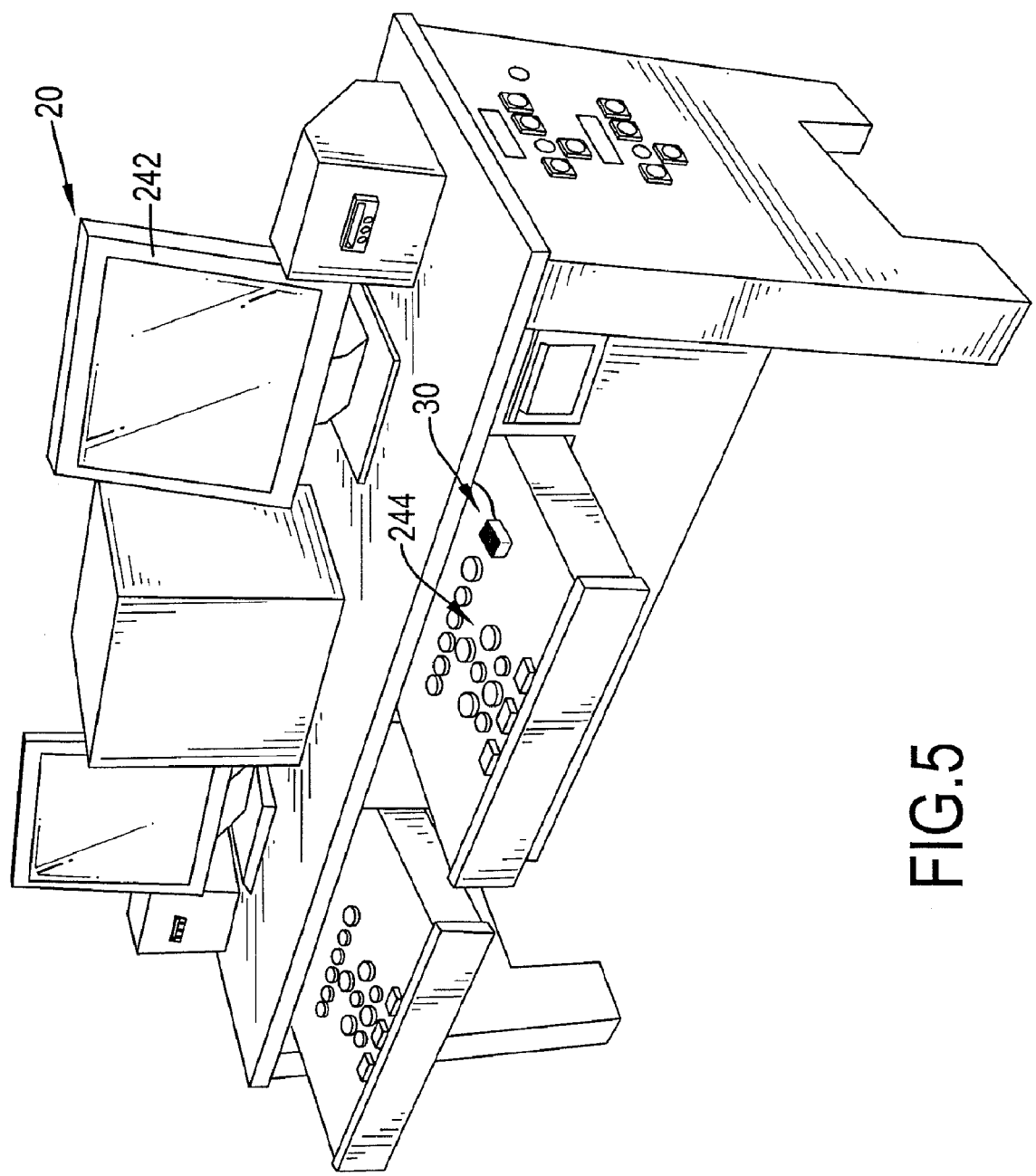
FIG. 5 is a perspective view of a player terminal apparatus in accordance with the present invention.

With reference to FIG. 5, the interface (24) corresponds to one player, accepts inputs from the player to participate the mahjong game program, display suits of the taken mahjong tiles to the player and may be a touch panel, a monitor (242) with a keyboard (244) or the like.

Figure 4:
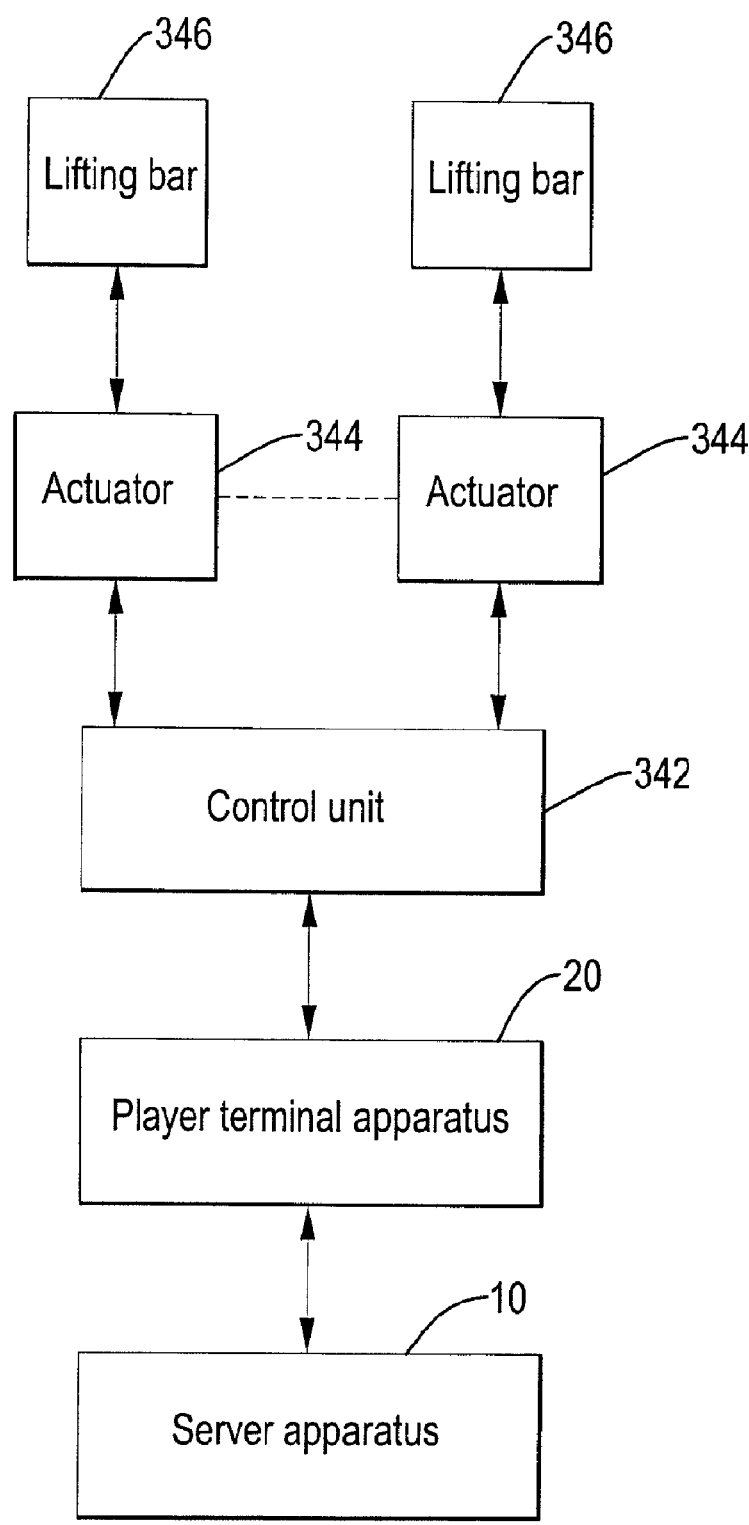
FIG. 4 is a block diagram of the suit variable mahjong tile in accordance with the preferred embodiment in FIG. 2.
Figure 8:
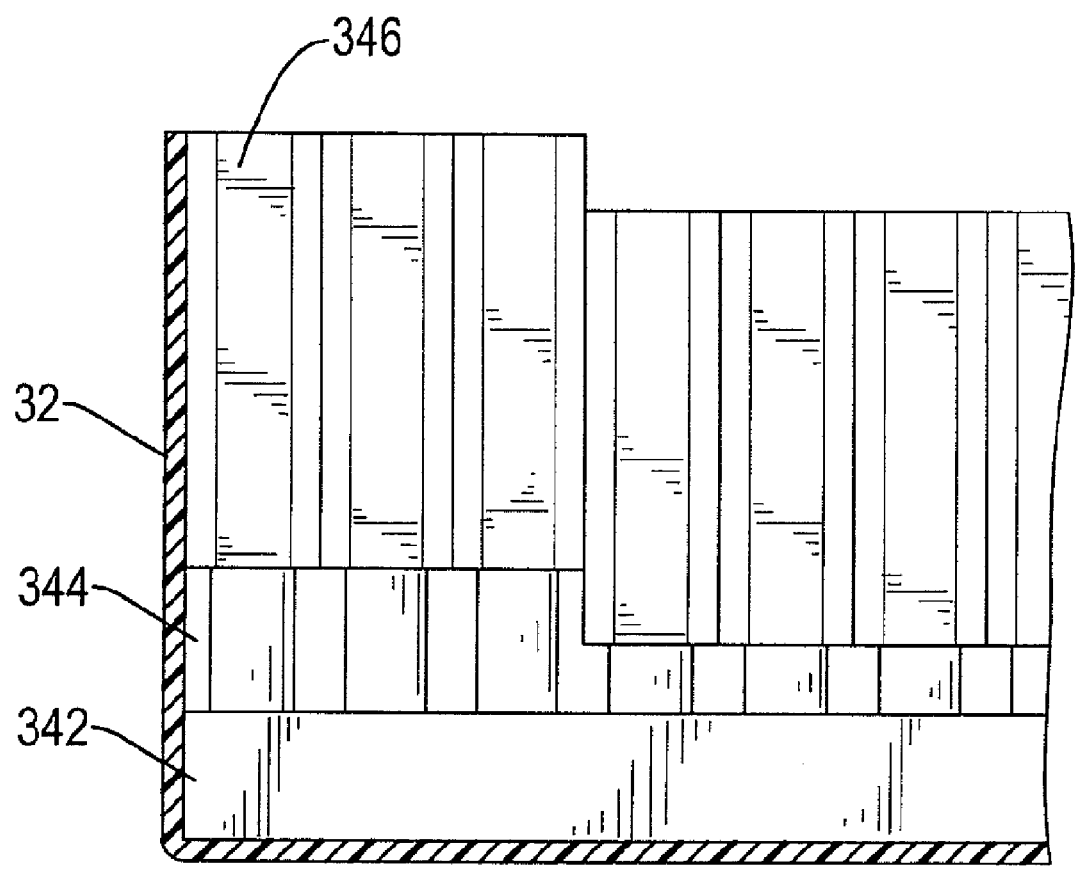
FIG. 8 is an enlarged side view in partial section of the suit variable mahjong tile in FIG. 3.

With reference to FIGS. 3, 4 and 8, the suit variable mahjong tile (30) is capable of generating lines corresponding to the suit of the taken mahjong tile and has a case (32) and a bar assembly (34). The case (32) is an empty rectangular case with an opening. The bar assembly (34) is mounted in the case (32) and has multiple lifting bars (346), multiple activators (344) and a control unit (342).

The lifting bars (346) are perpendicularly and movably mounted in the case (32) and each has a distal end and a connecting end.

The distal end of the lifting bar (346) is selectively located in and is flush with the opening of the case (32) at an initial position.

Each actuator (344) connects to the connecting end of one of the lifting bars (346). Each actuator (344) is controlled to selectively and slightly retracts the corresponding lifting bar (346) into the case (32) to make the distal end of the corresponding lifting bar (346) slightly retracted to form an indent. When a portion of actuators (344) are controlled to retract a part of lifting bars (346), the distal ends of the retracted lifting bars (346) may form a particular lines of a suit of the taken mahjong tile by the dealing module (144). Each actuator (344) may also be controlled to push the lifting bar (346) back to the initial position to erase the lines. FIG. 3 shows the lifting bars (346) at different locations are controlled to retract to form a "three Dots". When the suit variable mahjong tile (30) is controlled to form another line (e.g. two Dots), the retracted lifting bars (346) will be pushed back to the initial position first, then some the lifting bars (346) corresponding to a two Dots are retracted.

The actuators (344) may be linear actuators, relays or MEMS (Micro-Electro-Mechanical Systems) actuators, such like piezoelectric actuators, electrostatic micro membrane actuators or the likes.

The control unit (342) is electronically connected to the actuators (344), controls the actuators (344) to retract or push the lifting bars (346) to form the lines of the suit of recognized taken mahjong tile. The control unit (342) may be a printed circuit board (PCB) and the actuators (344) are piezoelectric actuators that are mounted on the PCB in matrix. The control unit (342) inputs a voltage to the piezoelectric actuator and causes the actuators (344) expansion or retraction, thereby the lifting bars (346) mounted on the actuators (344) are capable of retracting slightly into the case (32) or moving back to the initial position.

The player terminal (22) is electronically connected to the interface (24), the at least one suit variable mahjong tile (30) and the server (12). The player terminal (22) receives signal of the generated suit from the server (12) and controls the connected interface (24) to display the suit and to control the suit variable mahjong tile (30) to change the lines of the generated suit. Wherein, the player terminal (22) may control the suit variable mahjong tile (30) to generate the lines for the player to feel the lines by fingers first. After few seconds later or after reading an input signal from the interface (24) by the player, the player terminal (22) controls the connected interface (24) to display the suit for the players.

As described above, when the server (12) runs a Ton-Ze Mahjong game program as shown in FIG. 6, forty real mahjong tiles are shuffled and compactly stacked at beginning. The robot (1444) is controlled to take one mahjong tile from the stacked tiles one by one and moves the taken mahjong tile over the recognizer (1442) to recognize the suit of the taken mahjong tile. Successively, the robot (1444) moves the taken mahjong tile to one of the roles, meanwhile, the server (12) reads the recognized suit from the recognizer (1442) and sends the suit to a specific player terminal (22) or all player terminals (22). Afterwards, the player terminal (22) controls the corresponding suit variable mahjong tile (30) to change the lines in accordance with the received suit. Thereby, the player corresponding to the specific player terminal (22) may hold the suit variable mahjong tile (30) and feel lines on the suit variable mahjong tile (30) before uncovering the suit variable mahjong tile (30) or seeing the suit from the monitor (242). Hence, players may enjoy the convenience and reality when using the mahjong gaming apparatus with suit variable mahjong tiles in accordance with the present invention.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A mahjong gaming apparatus with suit variable mahjong tiles comprising
    a server apparatus having
        a server;
        a random number generator being electronically connected to the server and being controlled by the server to randomly generate a suit of a mahjong tile; and
    multiple player terminal apparatuses being electronically connected to the server and each one of the player terminal apparatuses having
        an interface accepting inputs and displaying the suit;
        at least one suit variable mahjong tile being capable of generating lines corresponding to the suit generated by the random number generator, each one of the at least one suit variable mahjong tile having
            a case being a rectangular case with an opening; and
            a bar assembly being mounted in the case and having
                multiple lifting bars being perpendicularly and movably mounted in the case and each having
                    a distal end being selectively located in and being flush with the opening of the case at an initial position; and
                    a connecting end;
                multiple actuators, each one of the actuators connecting to the connecting end of one of the lifting bars to selectively and slightly retract a corresponded lifting bar into the case or to selectively push the lifting bar back; and a control unit being electronically connected to the actuators, controlling the actuators to retract or to push the lifting bars to form lines corresponding to the suit; and a player terminal being electronically connected to the server, the interface and the at least one suit variable mahjong tile, receiving the suit from the server apparatus to control the at least one suit variable mahjong tile to change the lines and reading inputs from the interface.

2. The mahjong gaming apparatus as claimed in claim 1, wherein the random number generator further comprises an automatic tile shuffler being capable of shuffling a set of mahjong tiles and rearranging the shuffled mahjong tiles under covered status;

a dealing module being capable of taking one of the shuffled mahjong tile from the automatic tile shuffler and recognizing the suit of the taken mahjong tile; and a control module being electronically connected to the server, the automatic tile shuffler and the dealing module and being controlled by the server to control the dealing module to generate the suit of one of the mahjong tiles.

3. The mahjong gaming apparatus as claimed in claim 2, wherein each actuator is a Micro-Electro-Mechanical Systems actuator;

the automatic tile shuffler is an automatic mahjong shuffling table; and the interface is a touch panel.

4. The mahjong gaming apparatus as claimed in claim 3, wherein the dealing module further has a recognizer; and a robot being controlled to take one of the shuffled mahjong tiles to the recognizer for recognizing the suit of the taken mahjong tile.

5. A suit variable mahjong tile comprising a case being a rectangular case with an opening; and a bar assembly being mounted in the case and having multiple lifting bars being perpendicularly and movably mounted in the case and each having a distal end being selectively located in and being flush with the opening of the case at an initial position; and a connecting end;

multiple actuators, each one of the actuators connecting to the connecting end of one of the lifting bars to selectively and slightly retract a corresponded lifting bar into the case and to selectively push the lifting bar back to the initial position; and a control unit being electronically connected to the actuators, controlling the actuators to retract or to push the lifting bars to form lines corresponding to a suit of a mahjong tile.

6. The suit variable mahjong tile as claimed in claim 5, wherein each actuator is a Micro-Electro-Mechanical Systems actuator.

7. The suit variable mahjong tile as claimed in claim 5, wherein each actuator is a piezoelectric actuator.

* * * * *